Figure 1:
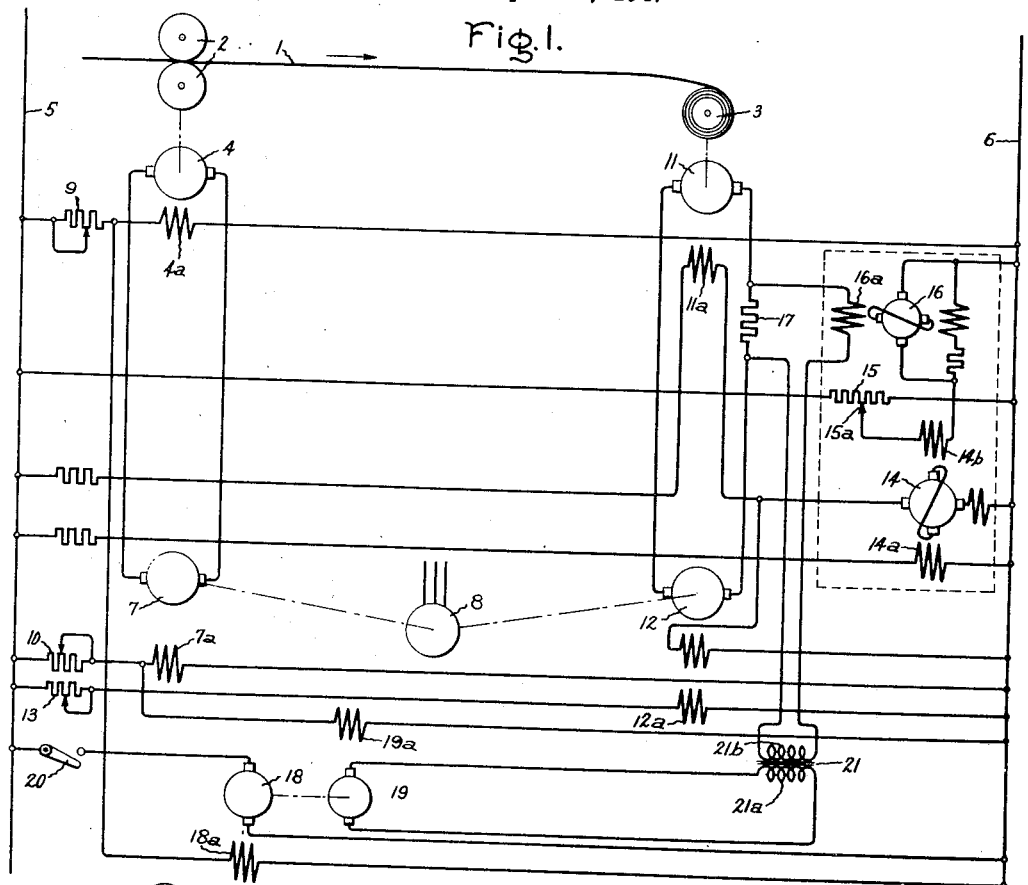

June 29, 1948.  F. E. CREVER  2,444,248

CONTROL SYSTEM

Filed April 3, 1947

Inventor:
Frederick E. Crever,
by
His Attorney.

Patented June 29, 1948

2,444,248

UNITED STATES PATENT OFFICE 2,444,248

CONTROL SYSTEM

Frederick E. Crever, Scotia, N. Y., assignor to General Electric Company, a corporation of New York Application April 3, 1947, Serial No. 739,199

6 Claims. (Cl. 318—6)

1

This invention relates to control systems, more particularly to systems for controlling the operation of electric motors, and it has for an object the provision of a simple, reliable and efficient control system of this character.

In the performance of operations on a length of material such as a strip of cold steel or a web of paper, it is frequently a requirement that the strip be wound upon a reel or unwound from a reel at substantially constant tension. With the reel motor supplied from a source of constant voltage and its field current varied to maintain the armature current constant, a constant horsepower characteristic results which produces constant tension in the material that is being reeled provided there is no acceleration. If there is any acceleration the torque of the reel motor is partly consumed in accelerating the mass of the armature and the reel. Consequently, the tension in the strip decreases. Accordingly, an object of the invention is the provision in a motor control system of means for increasing the power input to the reel motor during the accelerating period.

Another object of the invention is the provision of means for increasing the power input to the reel motor during that portion of the acceleration which is produced by weakening the field of the motor which determines the speed of the strip. In the case of a cold strip rolling mill the mill motor determines the speed of the strip.

A still more specific object of the invention is the provision of means for forcing an increase in the power input to the reel motor which leads the increase in the speed of the mill motor in time phase.

In carrying the invention into effect in one form thereof, the mill motor is supplied from an adjustable voltage generator and the reel motor is supplied from a suitable source of voltage which may also be an adjustable voltage generator. The armature current of the reel motor is maintained substantially constant by means of a regulator which varies the excitation of the reel motor in response to variations in its armature current. During acceleration the calibration or setting of the regulator is changed by means of an auxiliary motor and an auxiliary direct current generator driven thereby. A control device is provided for varying the excitation of the mill generator and a second control device is provided for varying the excitation of the mill motor. One of these control devices also varies the speed of the auxiliary motor and the other varies the excitation of the auxiliary generator. The output terminals of the auxiliary generator are connected through

2 a transformer to the input of the regulator with the result that its calibration or setting is varied in response to the rate of change of speed of the strip.

Figure 2:
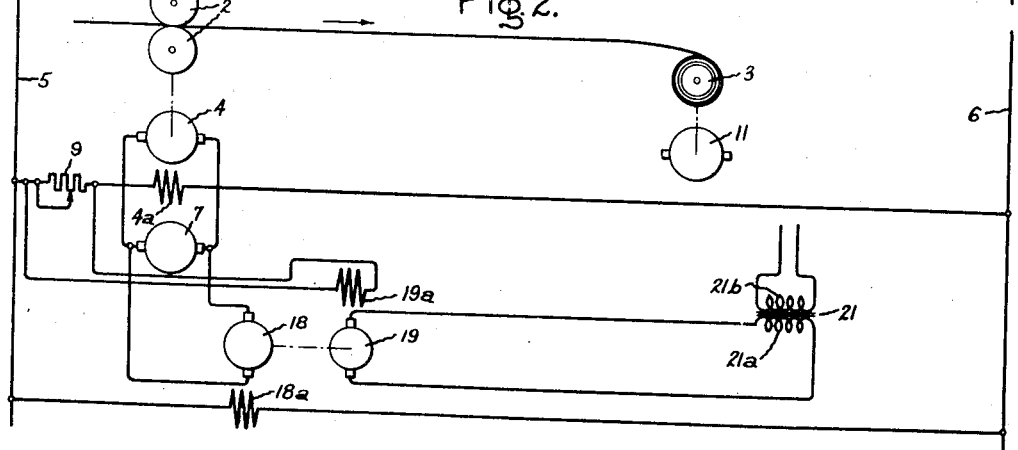
Figure 3:
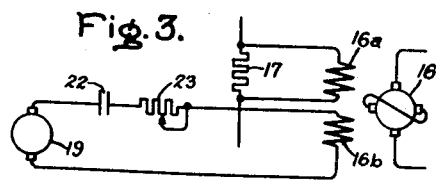

For a better and more complete understanding of the invention, reference should now be had to the following specification and to the accompanying drawing of which Fig. 1 is a simple, schematic diagram of an embodiment of the invention, and Figs. 2 and 3 are simple, schematic diagrams of modifications.

Referring now to the drawing, a length of material 1 such as a strip of cold steel is being passed through the thickness reducing mill rolls 2 in the direction of the arrow, and the delivered strip is being wound upon a take-up reel 3.

The mill rolls 2 are driven by a direct current motor 4 which is provided with a separately excited field winding 4a. This field winding is supplied from a suitable source of constant voltage such as represented by the two supply lines 5 and 6. Power is supplied to the armature of the motor 4 from an adjustable voltage generator 7 with the armature of which the armature of the motor is connected in a loop circuit. The generator is provided with a field winding 7a which is connected to be supplied from a suitable source of excitation such as the supply lines 5 and 6. The generator 7 is driven at a speed which is preferably substantially constant by any suitable driving means such, for example, as an induction motor 8.

A variable resistor 9 is included in series relationship with the field winding 4a of the mill motor to provide for increasing its speed above base speed by field weakening. A similar resistor 10 is included in series relationship with the field winding 7a of the supply generator to provide for varying the voltage of the generator and thereby correspondingly varying the speed of the motor 4.

The take-up reel 3 is driven by a direct current motor 11 which is provided with a separately excited field winding 11a which is connected to the constant voltage source 5, 6. An adjustable voltage generator 12 supplies power to the armature of the motor 11. The supply generator 12 is driven at substantially constant speed by suitable driving means such as the induction motor 8 which drives the supply generator 7. The generator 12 is provided with a separately excited field winding 12a which is connected to be supplied from the constant voltage source 5, 6. A variable resistor 13 is included in circuit with the field winding 12a to provide for varying the voltage of the generator and correspondingly varying the speed of the motor 11 which is supplied therefrom.

For the purpose of maintaining the armature current of the reel motor 11 substantially constant, suitable regulating means are provided. These means comprise an amplidyne exciter dynamoelectric machine 14 having its armature connected in circuit with the reel motor field winding 11a and connected to operate as a buck-boost exciter. It is provided with a reference field winding 14a and with a control field winding 14b.

The control field winding is connected in circuit between the supply line 6 and the slider 15a of a potentiometer 15 which is connected across the supply lines 5 and 6. Included in this circuit is the armature of a second amplidyne exciter dynamoelectric machine 16 which is connected to operate as a booster, i. e., its voltage adds to the voltage of the source. It is provided with a control field winding 16a which is included in a circuit across a resistor 17. This resistor is connected in series in the armature circuit of the reel motor. The amplidynes 14 and 16 are driven at constant speed by any suitable driving means such as an induction motor (not shown). They may if desired be driven by the induction motor 8. The polarity of the reference field of the amplidyne 14 is such as to cause the amplidyne to generate a voltage which bucks the voltage of the source 5, 6. The control field winding 14b has the opposite polarity and the net excitation of the amplidyne is equal to the difference of the ampere turns of these two field windings. Consequently, when the ampere turns of the reference field exceed the ampere turns of the control field, the net excitation of the machine produces a voltage which bucks the voltage of the excitation source. Similarly, when the ampere turns of the control field exceed the ampere turns of the reference field, the net excitation is of opposite polarity and causes the machine to generate a voltage which boosts the voltage of the excitation source.

For the purpose of increasing the torque of the reel motor sufficiently to maintain the tension in the strip constant during acceleration, a motor generator set is provided. It comprises an auxiliary direct current motor 18 and an auxiliary direct current generator 19 driven thereby. A starting switch 20 is provided for the purpose of connecting the armature of the motor 18 to the source 5, 6. The field winding 18a of the auxiliary motor is connected in parallel with the field winding 4a of the mill motor so that its excitation is varied in response to variation of the field weakening resistor 9 in the mill motor field circuit. Therefore the motor 18 will run at a speed which is proportional to the full voltage speed of the mill motor in the field weakening range. The field winding 19a of the auxiliary generator is connected in parallel with the field winding 7a of the supply generator. Consequently, its excitation is varied in response to variation of the resistor 10 to vary the excitation of the supply generator 7. Consequently, the voltage of the auxiliary generator 19 will be proportional to the voltage of the supply generator 7. The proportionality between the voltage of the supply generator and the voltage of the auxiliary generator will automatically vary, depending upon the speed of the mill motor 4 which, as explained in the foregoing, is made proportional to the full voltage speed of the mill motor in the field weakening range. Therefore the voltage of the auxiliary generator will be proportional to the speed of the mill motor irrespective of whether its speed is varied by armature voltage control or by field weakening.

Across the armature terminals of the generator 19 is connected a primary winding 21a of a transformer 21 of which the secondary winding is connected in series relationship with the control field winding 16a and the voltage drop resistor 17 in the armature circuit of the reel motor.

In operation, under steady state conditions, the regulating means maintains the current in the armature circuit of the reel motor substantially constant at a predetermined value. At constant voltage and constant strip speed this produces constant tension in the strip.

When the take-up reel is empty, the voltage drop across the resistor 17 produces minimum excitation of the control field winding 14b with the result that the net excitation of the amplidyne exciter 14 is maximum and the voltage of the amplidyne is maximum in the bucking direction. Consequently, the excitation of the reel motor is weakened and the motor rotates at high speed.

As the diameter of the coil increases with each wrap of the strip on the reel the speed of the reel motor tends to decrease slightly, with the result that the armature current tends to increase. However, as the armature current tends to increase, the voltage drop across the resistor 17 increases correspondingly and this results in increasing the excitation of the control field winding 14b. As a result, the net excitation of the amplidyne 14 is reduced, the bucking action is correspondingly decreased and the excitation of the reel motor field winding 11a is correspondingly increased. The increased excitation of the reel motor 11 increases its counter voltage so that the armature current is permitted to increase only the slight amount which is required to increase the strength of the field the amount necessary to increase the torque of the motor an amount corresponding to the increase in the diameter of the coil.

When the reel is half full, the ampere turns of both field windings 14a and 14b are equal, with the result that the net excitation of the field amplidyne is zero and the excitation of the field winding 11a of the reel motor is increased an amount corresponding to the decrease in the bucking action of the amplidyne.

As the diameter of the coil continues to increase, the ampere turns of the control field winding 14b become greater than the ampere turns of the reference field winding 14a, with the result that the voltage of the amplidyne 14 reverses, and adds to or boosts the voltage of the source, thereby to continue to strengthen the excitation of the reel motor field and to decrease the speed of the reel motor correspondingly. At full reel, the ampere turns of the control field winding 14b are maximum and the net excitation of the amplidyne is maximum in the boosting direction, with the result that the excitation of the reel motor is maximum and its speed minimum.

In order to maintain the tension in the strip constant during acceleration from rest, it is necessary to increase the torque of the reel motor by an amount equal to that portion of the total torque required to effect the acceleration of the reel and the motor armature. This is accomplished by the auxiliary motor generator set 18, 19 in the following manner: Acceleration from rest to base speed of the mill motor 4 is effected by varying the resistor 10 to vary the excitation of the supply generator 7. During this portion of the acceleration the excitation of the mill motor remains constant at base value and consequently the excitation and speed of the auxiliary motor 18 remain constant during this period. The variation of the resistor 10 to increase the voltage of the supply generator correspondingly increases the current flowing in the field winding 19a of the auxiliary generator 19. As a result, the voltage of the generator 19 is increased in proportion to the increase in the voltage of the supply generator 7, and to the increase in the speed of the mill motor 4 which is ultimately produced by the increased voltage. The increase in voltage of the generator 19 causes a voltage to be induced in the secondary winding 21b of the transformer. This induced voltage is proportional to the rate at which the voltage of the generator 19 changes and therefore proportional to the rate of change of the voltage of the supply generator 7 and the resulting rate of change of speed of the mill motor 4. In other words, the voltage induced in the secondary winding 21b is proportional to the acceleration of the mill motor. The connections of the secondary winding are such that the induced voltage opposes the voltage drop across the resistor 17. The effect on the regulator is the same as though the voltage drop across the resistor 17 and the armature current which produces it had decreased. Consequently, the regulator responds to decrease the current flowing in the field winding 11a of the reel motor. This results in an increase in the armature current sufficient to increase the voltage drop across the resistor 17 by an amount equal to the voltage induced in the secondary winding 21b of the transformer. In other words, the regulator increases the armature current of the reel motor by the amount required to satisfy the regulator. This amount is proportional to the voltage induced in the secondary winding 21b which, as stated in the foregoing, is proportional to the acceleration of the mill motor 4. When the resistor 10 is completely short circuited to produce full voltage of the supply generator 7, there is no further change in the excitation of the auxiliary generator 19 and consequently the voltage induced in the secondary winding 21b is zero. As a result, the regulator operates to decrease the armature current of the reel motor to the predetermined value which it is calibrated to maintain under steady state conditions.

However, if the resistor 9 in circuit with the field winding 4a of the mill motor is varied to weaken the field of the mill motor to increase its field above basic speed, the field of the auxiliary motor 18 is correspondingly weakened and the speed of the auxiliary motor 18 and the voltage of the generator 19 are correspondingly increased. A voltage is induced in the secondary winding 21b which is proportional to the rate of change of excitation of the mill motor and therefore proportional to the acceleration which follows. Consequently, the regulator is unsatisfied and it functions to increase the armature current of the reel motor in the manner described in the foregoing. The amount which the armature current is increased is proportional to the voltage induced in the secondary winding 21b which is proportional to the rate of change of excitation of the mill motor and therefore proportional to its acceleration.

Thus, whether the mill motor is accelerated by increasing the voltage supply to its armature or by weakening its field, the torque of the reel motor is increased by an amount equal to the portion of the total torque which is required to effect the acceleration of the reel and the reel motor armature.

Under varying conditions the voltage of the auxiliary generator will lead the speed of the mill motor in time phase because the auxiliary motor 18 has a lower inertia constant than the mill motor, and the auxiliary generator field has a lower time constant than the time constant of the field of the supply generator 7. The rate of change transformer 21 which is employed to recalibrate the current regulator during acceleration or deceleration inevitably has some delay between the rate of change of input voltage and the voltage induced in the secondary winding. The leading time phase of the voltage of the auxiliary generator with respect to the speed of the mill motor is useful because the delay in the rate of change transformer causes a lag, and by proper proportionaling, the induced voltage in the secondary winding of the rate of change transformer may be made proportional in magnitude and in time phase with the rate of change of mill speed. This is highly useful and advantageous in preventing loss of tension in the strip.

The transformer 21 may be replaced by a capacitor as illustrated in Fig. 3. The change in the voltage of the auxiliary generator 19 produces a change in current which is proportional to the rate of change of this voltage and therefore proportional to the acceleration of the mill. This voltage is used in the same manner that the induced voltage in the secondary winding of the transformer in Fig. 1 is used to recalibrate the regulator, thereby to increase the armature current of the reel motor to maintain the tension in the strip substantially constant.

In the modification illustrated in Fig. 2, the armature of the auxiliary motor 18 is connected to the armature terminals of the supply generator, and its field winding 18a is connected across the constant voltage excitation source 5, 6. The field winding 19a of the auxiliary generator 19 is connected across the variable resistor 9 in the field circuit of the mill motor. As a result of these connections, an increase in the voltage of the supply generator to increase the speed of the mill motor results in a corresponding increase of speed of the auxiliary motor 18 and a corresponding increase in the voltage generated by the auxiliary generator 19. Similarly, an increase in the effective portion of the resistor 9 to weaken the field of the mill motor and to increase its speed results in a corresponding increase in the excitation of the auxiliary generator 19 and a corresponding increase in its voltage. This modification is otherwise identical with that of the modification of Fig. 1.

The modification of Fig. 3 differs from the modification of Fig. 1 in that the amplidyne 16 is provided with an additional control field winding 16b which is connected to the terminals of the auxiliary generator 19. A capacitor 22 and an adjustable resistor 23 are connected in series in the circuit of field winding 16b. The transformer 21 of the modifications of Fig. 1 is omitted and the main control field winding 16a of the amplidyne 16 is connected directly across the resistor 17. During acceleration, or deceleration, a charging current will flow in the circuit of the capacitor 22 and field winding 16b as a result of the change in voltage of the generator 19. This will modify the net excitation of the amplidyne in the same sense that the voltage in the secondary winding 21b in Fig. 1 modified the amplidyne excitation. The remainder of the operation is the same as the operation of the modification of Fig. 1.

Although in accordance with the provisions of the Patent Statutes this invention is described as embodied in concrete form and the principle thereof has been explained together with the best mode in which 't is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A control system comprising a first electric motor, a source of supply for said motor, an adjustable voltage generator provided with a field winding, a second motor provided with a field winding supplied from said generator, a regulator having connections to the armature responsive to the armature current of said first motor for maintaining said armature current constant at a predetermined value, means for varying the current in said generator field winding, means for varying the current in the field winding of said second motor, an auxiliary motor having a field winding connected across the field winding of said second motor, an auxiliary direct current generator driven by said auxiliary motor and having a field winding connected across said generator field winding, a transformer having its primary winding connected across the armature of said auxiliary generator and having its secondary winding connected in circuit with said regulator to cause said regulator to vary the armature current of said first motor in accordance with the rate of change of speed of said second motor.

2. A control system comprising a first electric motor, a source of supply for said motor, a regulator having connections to the armature circuit of said motor and responsive to the armature current thereof for maintaining said armature current constant at a predetermined value, a supply generator provided with a field winding, a motor supplied from said generator and provided with a field winding, an auxiliary motor provided with a field winding, an auxiliary direct current generator driven by said motor and provided with a field winding, a variable resistance for simultaneously varying the currents in said field windings of said generators, a second variable resistance for varying the currents in the field windings of said second motor and said auxiliary motor, and a transformer having its primary winding connected across the armature of said auxiliary generator and having its secondary winding in said connections between said regulator and said armature circuit to vary the value of the current maintained by said regulator in proportion to the rate of change of speed of said second motor.

3. A control system comprising a first electric motor, a source of supply for said motor, a regulator having a control winding connected to the armature circuit of said motor to be responsive to the armature current for maintaining said armature current substantially constant at a predetermined value, a supply generator provided with a field winding, a second electric motor supplied from said generator and provided with a field winding, an auxiliary motor provided with a field winding, an auxiliary direct current generator driven by said auxiliary motor and provided with a field winding, a variable resistor for simultaneously varying the currents in the field windings of said generators, a second variable resistor for varying the currents in the field windings of said second motor and said auxiliary motor, a transformer having its primary winding connected across the armature of said auxiliary generator, and having its secondary winding connected in circuit with said control winding of said regulator for varying the value of current held by said regulator in proportion to the rate of change of speed of said second motor.

4. A control system comprising a first electric motor having a field winding, a source of supply for said motor, an adjustable voltage supply generator provided with a field winding, a second electric motor provided with a field winding and having its armature supplied from said generator, an auxiliary motor provided with a field winding, an auxiliary direct current generator driven by said auxiliary motor and provided with a field winding, a variable resistor for simultaneously varying the currents in the field windings of said second motor and said auxiliary motor, a second variable resistor for varying the currents in the field windings of said generators, a transformer having its primary winding connected across the armature of said auxiliary generator and regulating means comprising an exciter dynamoelectric machine having its armature connected in circuit with the field winding of said first motor, and responsive to the current in the armature circuit of said first motor for maintaining said armature current substantially constant at a predetermined value and responsive to the secondary voltage of said transformer for varying the value of the current maintained by said regulating means in proportion to the rate of change of speed of said second motor.

5. A control system comprising a first electric motor having a field winding, a source of supply for said motor, an adjustable voltage supply generator, a second electric motor provided with a field winding and having its armature supplied from said generator, a variable resistor for varying the current in the field winding of said generator, a second variable resistor for varying the current in the field winding of said second motor, an auxiliary motor connected to have its speed varied in response to variation of one of said resistors, an auxiliary direct current generator driven by said motor and provided with a field winding connected to have its current varied in response to variation of the other of said resistors, a transformer having its primary winding connected across the armature of said auxiliary generator, and a regulator comprising an exciter dynamoelectric machine having its armature connected to control the current in the field winding of said first motor and having field winding means connected to be responsive to the armature current of said first motor for maintaining said armature current substantially constant, and responsive to the secondary voltage of said transformer for varying the value of the current maintained by said regulator in proportion to the rate of change of speed of said second motor.

6. A control system comprising a first electric motor having a field winding, a source of supply for said motor, an adjustable voltage supply generator, a second electric motor provided with a field winding and having its armature supplied from said generator, a variable resistor for varying the current in the field winding of said generator, a second variable resistor for varying the current in the field winding of said second motor, an auxiliary motor connected to have its speed varied in response to variation of one of said resistors, an auxiliary direct current generator driven by said motor and provided with a field winding connected to have its current varied in response to variation of the other of said resistors, a voltage drop device in the armature circuit of said first motor, a regulator comprising an exciter dynamoelectric machine having its armature connected to control the current in the field winding of said first motor and having field winding means connected to be responsive to the voltage across said voltage drop device for maintaining the armature current of said first motor substantially constant at a predetermined value, a transformer having its primary winding connected across the armature of said auxiliary generator and having its secondary winding connected to vary the excitation of said exciter machine to vary the value of current maintained by said regulator in proportion to the rate of change of speed of said first motor.

FREDERICK E. CREVER.